(12) United States Patent
Steenis et al.

(10) Patent No.: US 6,710,300 B2
(45) Date of Patent: Mar. 23, 2004

(54) CONTACT TIP ASSEMBLY FOR MIG GUN

(75) Inventors: Robert D. Steenis, Kaukauna, WI (US); Richard M. Hutchison, New London, WI (US); Richard W. Beeson, Appleton, WI (US); Lin Zhang, Appleton, WI (US); James L. Uecker, Appleton, WI (US); Todd E. Holverson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 38 days.

(21) Appl. No.: 10/375,583

(22) Filed: Feb. 27, 2003

(65) Prior Publication Data

US 2003/0127444 A1 Jul. 10, 2003

Related U.S. Application Data

(62) Division of application No. 09/648,201, filed on Aug. 25, 2000, now Pat. No. 6,559,416.

(51) Int. Cl.[7] .................................................. B23K 9/24
(52) U.S. Cl. ............................................... 219/137.61
(58) Field of Search .................................... 219/137.61

(56) References Cited

U.S. PATENT DOCUMENTS

| | | | | |
|---|---|---|---|---|
| 2,179,108 A | * | 11/1939 | Westberg | 219/137.61 |
| 2,315,358 A | * | 3/1943 | Smith | 219/137.61 |
| 3,038,059 A | * | 6/1962 | Hinrichs | 219/137.61 |
| 3,249,734 A | * | 5/1966 | Meyer | 219/137.61 |
| 3,283,121 A | * | 11/1966 | Bernard et al. | 219/137.61 |
| 4,482,797 A | * | 11/1984 | Shiramizu et al. | 219/137.61 |

* cited by examiner

Primary Examiner—Clifford C. Shaw
(74) Attorney, Agent, or Firm—Mark W. Croll; John H. Pilarski

(57) ABSTRACT

A current path for a mig welding gun assures a reliable and stable interface between a welding gun and a weld wire. In one embodiment, the current path is through a conductive insert that fits in the welding gun diffuser. Fingers of the insert resiliently contact the weld wire and thereby provide stable paths for welding power from the gun to the weld wire. In another embodiment, a contact tip assembly comprises a contact tip having resilient fingers in electrical contact with a body. An inner frusto-conical surface of a sleeve is urged against concentric frusto-conical outer surfaces of the fingers to bias the fingers radially inwardly against the weld wire. An insulative liner in the contact tip guides the weld wire between the fingers. A shield surrounds the contact tip and the sleeve. In a further embodiment, a single finger is pivotally connected to the contact tip. A spring biases a finger end against the weld wire. In an alternate embodiment, the finger is wedge shaped and is held in an angled slot in the contact tip.

10 Claims, 6 Drawing Sheets

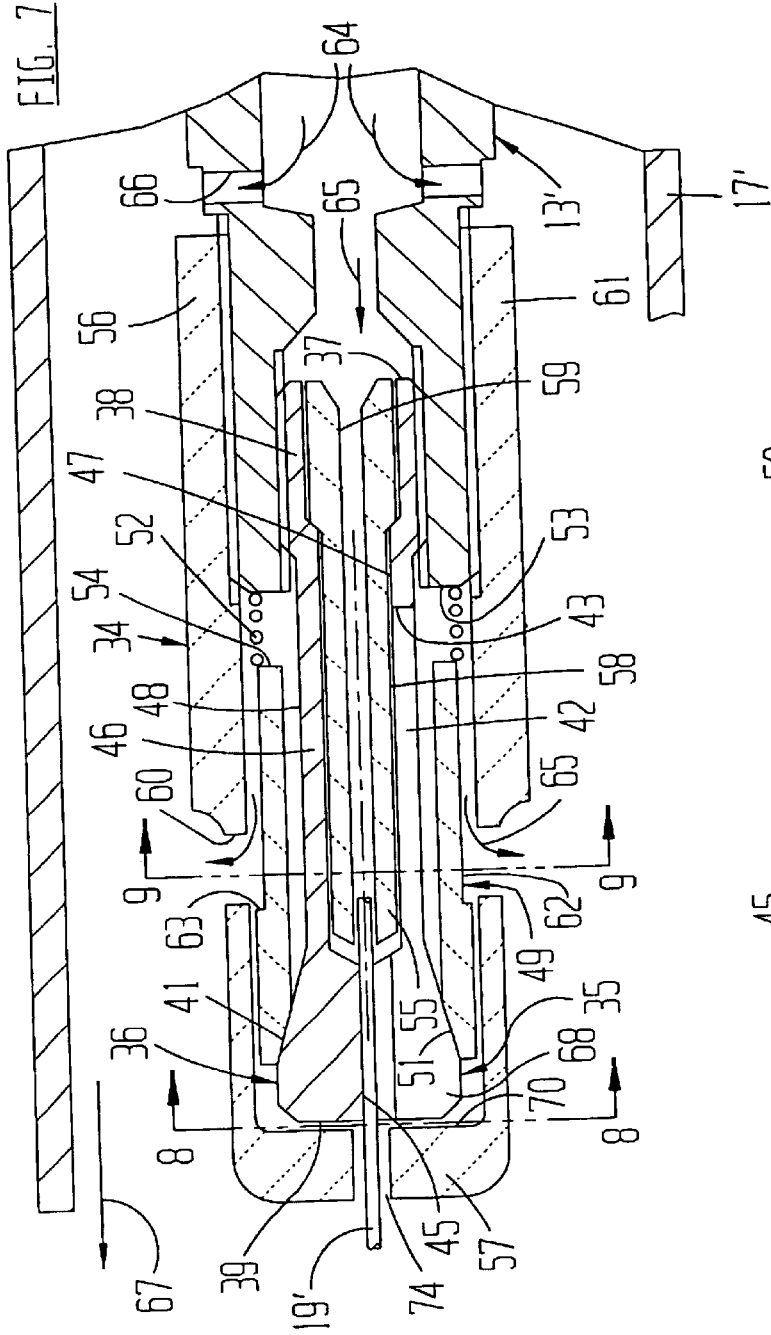
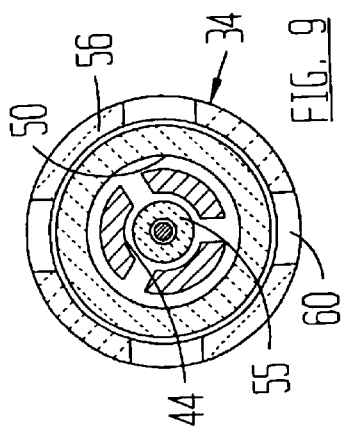
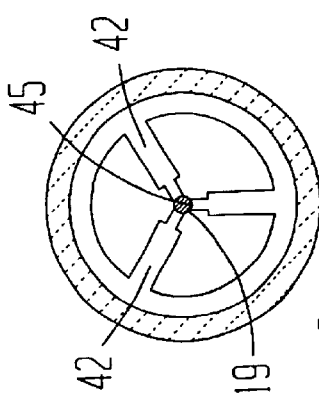

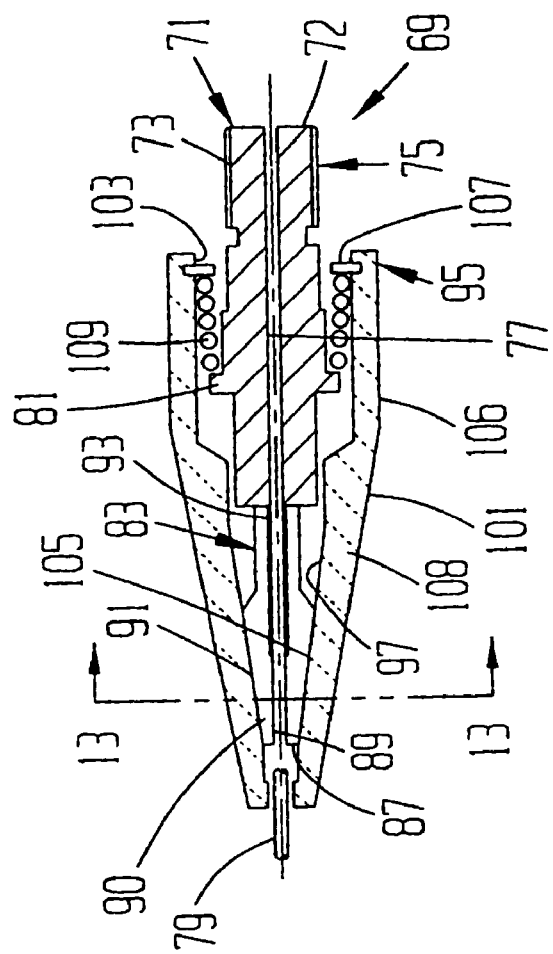

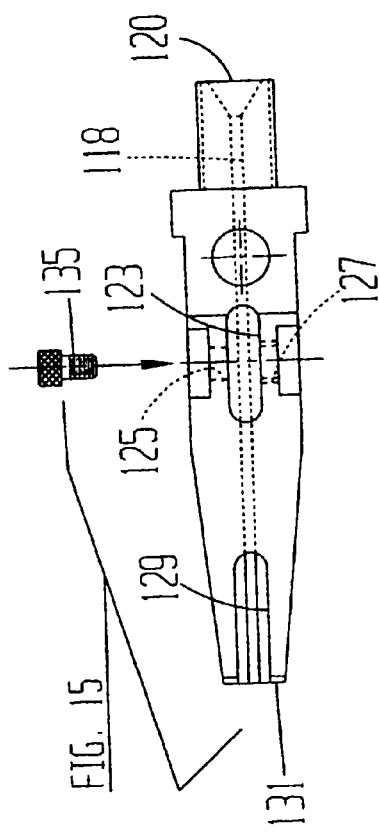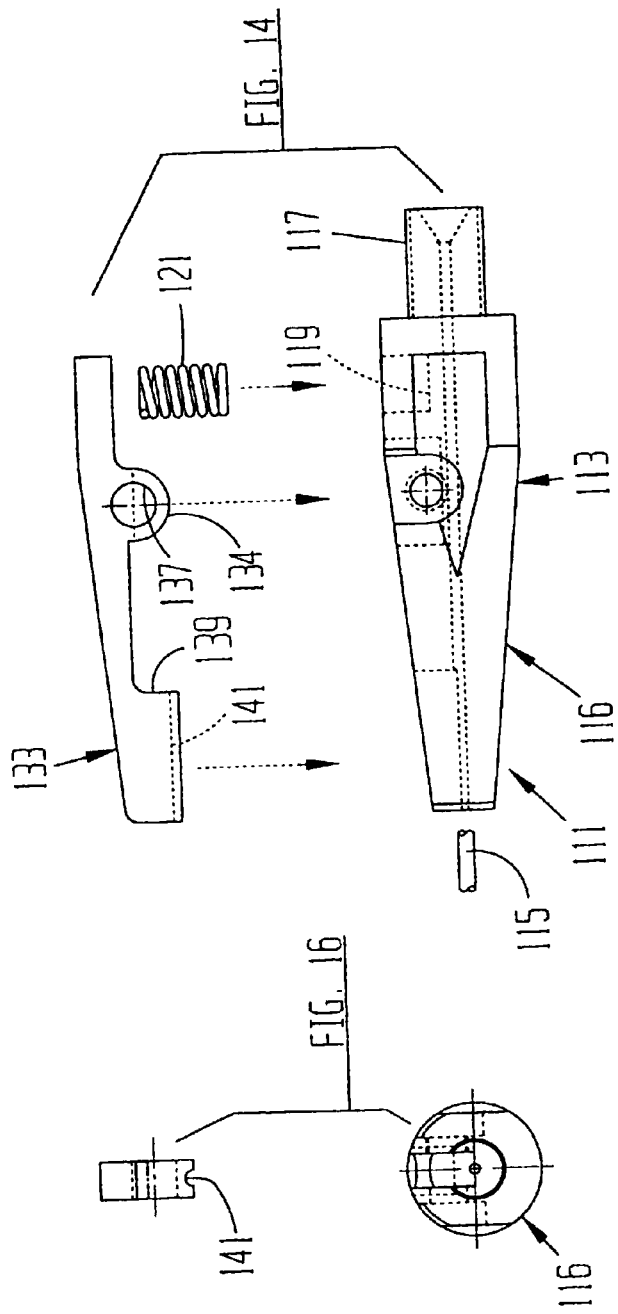

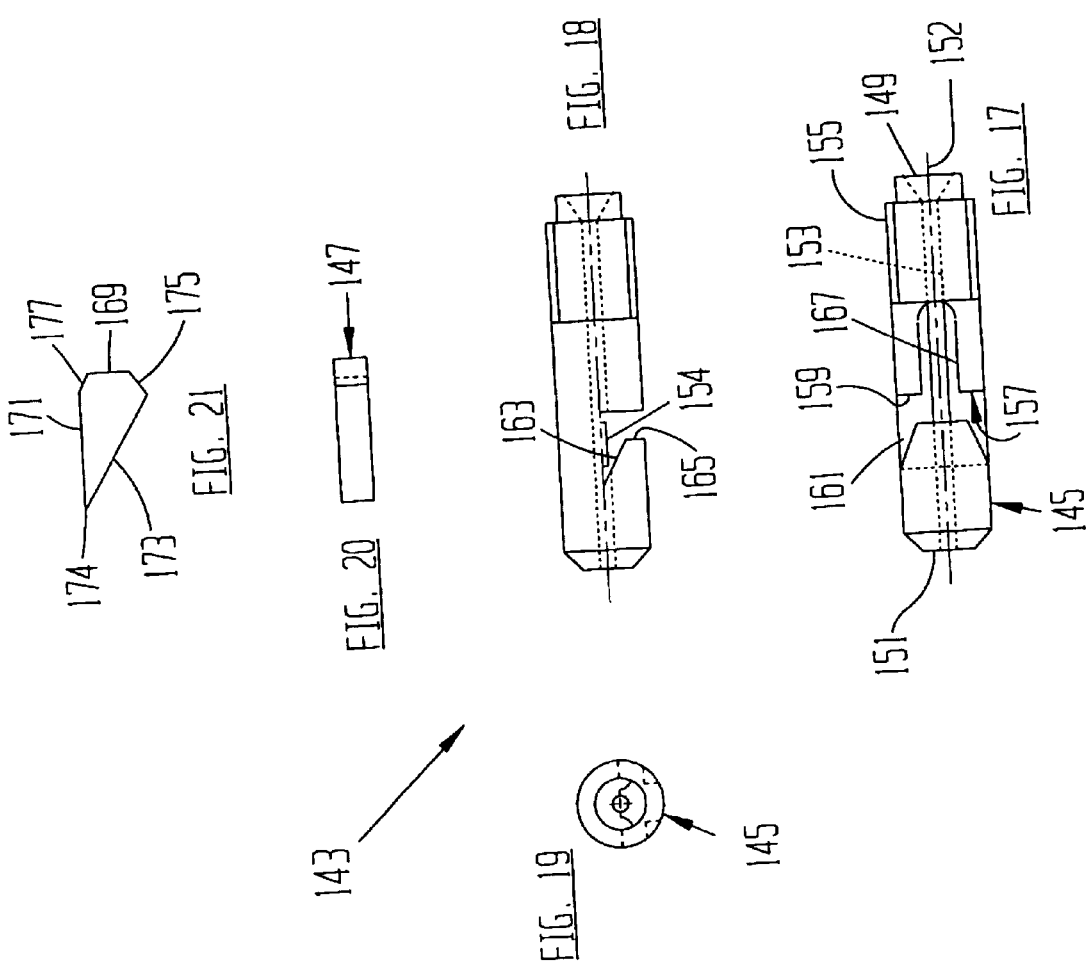

CONTACT TIP ASSEMBLY FOR MIG GUN

This application is a divisional of U.S. patent application Ser. No. 09/648,201 filed Aug. 25, 2000 now U.S. Pat. No. 6,559,416.

BACKGROUND OF THE INVENTION

1. Field of the Invention

This invention pertains to wire welding, and more particularly to apparatus that conducts welding power to a weld wire.

2. Description of the Prior Art

To properly perform wire welding, it is imperative that the conduction of welding power from a welding gun to the weld wire be controlled. Historically, welding power conduction occurred inside a copper contact tip in the gun. The contact tip had a hole through which the weld wire passed. The relatively long length of the contact tip and a small clearance between the contact tip hole and the weld wire increased the probability of smooth and consistent power conduction.

However, it has long been recognized that a problem existed in conducting the welding power from the contact tip to the weld wire. The problem had several aspects. The first was the lack of constant contact between the contact tip and the weld wire. Under the great majority of operating conditions, the weld wire was indeed in contact with the contact tip. Nevertheless, in some instances there were momentary conditions in which no contact occurred. In those situations, the welding current could arc across the clearance between the contact tip and the weld wire. The arcing was detrimental to the welding process.

Some prior welding machines relied on the inherent cast of the weld wire to produce a constant contact between the contact tip and the weld wire. However, non-uniformities of the weld wire cast, combined with movements in space of the welding gun during operation, inevitably resulted in momentary breakages of contact between the contact tip and the weld wire.

A second aspect of the welding power conduction problem concerned the size of the area of the interface between the contact tip and the weld wire. As mentioned, for the great majority of time during a welding process, the weld wire was in contact with the contact tip. However, even during those times of contact the areas of contact were usually very small. The typically large welding currents resulted in very high current densities, which tended to produce tiny microwelds between the contact tip and the weld wire. The small welded areas between the contact tip and weld wire were usually quickly remelted or mechanically broken. However, a stick-slip type of weld wire feeding resulted. The stick-slip feeding of the weld wire caused by repeated microweld creation and breakage contributed to poor welding performance.

A third aspect of the problem involving welding power conduction in prior welding guns was that is was possible, and even likely, that at some times during a welding operation the weld wire contacted the contact tip at more than one interface. AL any particular moment, the locations of the interfaces were randomly variable along the length of the contact tip. Because of the greater electrical resistance of the weld wire than the contact tip, the amount of welding power conduction was greatest at the interface that was closest to the downstream end of the contact tip. As a result, almost all of the preheating of the weld wire occurred between the downstream interface and the workpiece. Since the interface furthest downstream invariably changed location within the contact tip during a welding operation, the amount of preheating of the weld wire also varied. Changes in the weld wire preheating changed the characteristics of the welding arc and therefore were potentially detrimental to satisfactory welding.

Further aspects of the problems involving prior contact tips included wear of the tip clearance hole. The wear contributed to random and inconsistent interfaces between the contact tip and the weld wire. The weld wire frequently had shavings and other debris clinging to it. When the foreign matter entered the contact tip it could become trapped and prevent the weld wire from feeding properly.

Related problems included spatter from the welding arc that could fly up and stick to the end of the contact tip, where it was likely to build up and stick to the weld wire. Burnback caused by a failure anywhere in the welding machine could destroy any contact tip. Similarly, excessive heat from the welding arc could cause a contact tip to reach a plastic state and wear out prematurely.

It is therefore well recognized that a contact tip can fail in a number of ways. For example, U.S. Pat. No. 3,112,393 mentions the tendency of a weld wire to arc and fuse to the contact tip, which results in a short life for the contact tip.

Prior contact tips were often treated as low cost consumable items. Yet, a contact tip failure could disrupt an entire production line. In addition, a malfunctioning contact tip caused inconsistent or improper operation of other components of a welding machine such as the weld wire feeder or the gas flow. Frequently, other welding machine components than the contact tip were searched and mis-diagnosed as the source of the problem.

Accordingly, numerous attempts have been made to solve one or more aspects of the contact tip and the weld wire interface problem. For example, to assure a constant interface, power carrying wire feed rollers were used in some welding machine guns to ensure a constant location of the interface. The feed rollers were not the complete answer, however, because additional interfaces were present at the contact tip. As mentioned, the electrical resistance of the contact tip was less than the resistance of the weld wire. Hence, even with conductive feed rollers the most downstream interface between the contact tip and the weld wire remained random and uncontrollable.

Other proposed solutions included a non-circular clearance hole in the contact tip, such as is shown in U.S. Pat. No. 5,635,091. U.S. Pat. No. 5,278,392 shows a contact tip that is covered with a graphite cover. U.S. Pat. Nos. 4,945,208 and 4,978,831 teach a chrome plated bushing covering the downstream end of a contact tip to eliminate carbon residue on the tip.

A solution for arcing and microwelding proposed by U.S. Pat. No. 3,112,393 is a contact tip having a helical clearance hole for the weld wire. A somewhat similar proposal is described in Great Britain patent 2,074,069A. That patent shows a contact tip with one or two projections inside the contact tip clearance hole. The projections force the weld wire to change direction inside the contact tip and thereby assure good contact with the contact tip. Another helix-related contact tip is described in U.S. Pat. No. 4,733,052, in which a contact tip is in the form of a rectangular strip wound into a helix. A central longitudinal opening through the helix is smaller than the diameter of the weld wire, such that the weld wire is resiliently squeezed by the contact tip.

U.S. Pat. 4,563,569 describes a welding gun in which a weld wire guide tube is transversely pivotable within the gun body. Springs within the gun urge the guide tube transversely such that the weld wire is urged into transverse contact with the clearance hole in the contact tube, which is fixed relative to the gun body.

In U.S. Pat. 3,102,947, arcing between the contact tip and the weld wire is prevented by lining the contact tip with an insulative sleeve. Welding power is transferred to the weld wire upstream of the contact tip.

U.S. Pat. No. 4,988,846 describes a contact tip with an arcuate groove cut in the wall between two coaxial clearance holes for the weld wire. The weld wire contacts and is deflected by the groove surface, thus assuring an intimate interface between the contact tip and the weld wire. The same principal is used in U.S. Pat. No. 3,142,746, which discloses a ball that partially closes the clearance hole in the contact tip. The ball is biased radially against the weld wire to assure a constant interface between the contact tip and the weld wire.

U.S. Pat. No. 4,731,518 teaches a welding gun with a reverse radius in the head tube between the gun handle and the contact tip. The reverse radius causes the weld wire to be biased against the clearance hole in the contact tip.

Japan patent JP-11170052-A describes three parallel cylindrical columns arranged in a triangle to form a central hole through which a weld wire passes. The three columns are held in place against each other by an elastic band surrounding the columns. The elastic band, in turn, is captured inside a tube. The elastic band urges the columns radially inwardly against the weld wire.

Despite the long felt need for a controlled and reliable interface between a contact tip and a weld wire, and despite the numerous attempts to solve the interface problem, none of the prior solutions is entirely satisfactory.

SUMMARY OF THE INVENTION

In accordance with the present invention, an alternate current path for a metal inert gas (mig) gun reliably assures a stable interface between a contact and a weld wire. This is accomplished by apparatus that includes fingers that maintain positive contact with the weld wire under all operating conditions According to one aspect of the invention, the fingers are an integral part of a conductive insert that fits in a welding gun diffuser. The fingers are on an end of a tubular body that is split longitudinally. The body has a nominal outer diameter that is slightly greater than an associated inner diameter of the diffuser. Installing the insert in the diffuser causes the body and fingers to collapse radially slightly. The fingers are then spaced apart a distance less than the diameter of the weld wire. Feeding the weld wire resiliently springs the fingers radially apart. The natural inwardly restoring force of the insert material produces a reliable interface for conducting welding power from the diffuser to the weld wire. The insert thus provides additional stable paths for the welding power from the welding gun to the weld wire. The current densities along the additional paths are reduced. In turn, the reduced current densities reduce the likelihood of microwelds occurring at the weld wire that could cause stick-slip feeding during welding operations.

According to another aspect of the invention, the fingers are incorporated into a contact tip that is part of a contact tip assembly. A body on a first end of the contact tip is threaded to engage a diffuser. The fingers are at the second end of the contact tip and are integral with the body. The outer diameter of the fingers at the contact tip second end define concentric partial frusto-conical surfaces that diverge toward the second end. An annular member such as a sleeve fits over the contact tip. A frusto-conical surface on the inner diameter of the sleeve matches the frusto-conical surfaces of the fingers. A spring is interposed between the sleeve and the diffuser. The spring urges the sleeve frusto-conical surface against the finger frusto-conical surfaces and thereby biases the fingers radially inwardly against the weld wire, which is fed through the contact tip and the fingers. Not only do the fingers provide a reliable interface that eliminates arcing, but they also assure that the interface is only at the downstream end of the contact tip. Consequently, there is only one consistent location for the interface. Weld wire preheating is thus constant, which greatly aides in controlling the welding process. To be certain that the weld wire does not protrude through any of the spaces between the fingers, a liner may be assembled inside the contact tip surrounding the weld wire.

It is a feature of the invention that the contact tip assembly further comprises a non-metallic shield surrounding the contact tip and the sleeve. The weld wire passes through a clearance hole in an end wall of the shield. The shield protects the contact tip from welding spatter and burnback. To prevent burnback at the contact tip, the shield clearance hole is substantially larger in diameter than the weld wire diameter. Any molten material created during a burnback situation is not sufficient to plug the shield hole and thereby cause harm to the contact tip.

In a modified embodiment of the invention, the contact tip assembly has a contact tip with fingers that define concentric partial frusto-conical surfaces that converge toward the second end. An annular member in the form of a casing has a first end with a trusto-conical inner surface that matqhes the contact tip frusto-conical surfaces. A spring acts between the casing second end and contact tip to urge the contact tip frusto-conical surfaces against the casing frusto-conical surface. The contact tip fingers are thus biased radially inwardly against a weld wire. The radially inward force of the fingers on the weld wire eliminates arcing and also provides a reliable interface between the contact tip and the weld wire only at the downstream end of the contact tip.

An alternate embodiment of the alternate current path according to the invention comprises a contact tip assembly with a pivotable finger incorporated into a contact tip. One end of the contact tip engages a diffuser. The outer diameter of the contact tip is recessed at its second end such that a short length of the weld wire is exposed. The finger is connected to the contact tip for pivoting about an axis perpendicular to the weld wire. The finger has a tab that fits in the contact tip recess and contacts the exposed length of the weld wire. A spring acts between the contact tip and the finger second end in a manner that presses the finger tab against the weld wire. The result is a reliable interface between the weld wire and the contact tip only at the contact tip downstream end.

In a further alternate embodiment, the alternate current path comprises a contact tip assembly having a finger that is wedged in a contact tip. The outer diameter of the contact tip is slotted such that a length of the weld wire is exposed The contact tip is further shaped with an angled notch adjacent the recess. The finger fits in the contact tip slot and is held there by an end that fits in the angled notch. The finger has a longitudinal surface that contacts the exposed length of the weld wire to assure a single reliable interface between the weld wire and the contact tip.

Other advantages, benefits, and features of the present invention will become apparent to those skilled in the art upon reading the detailed description of the invention.

BRIEF DESCRIPTION OF THE DRAWINGS

FIG. 7 is a longitudinal cross sectional view of a modified contact tip assembly according to the present invention.

FIG. 8 is a cross sectional view taken along line 8—8 of FIG. 7.

FIG. 9 is a cross sectional view taken along line 9—9 of FIG. 7.

FIG. 10 is a longitudinal cross sectional view of a further modified contact tip assembly according to the present invention.

FIG. 11 is a first end view of FIG. 10.

FIG. 12 is a second end view of FIG. 10.

FIG. 13 is a cross sectional view taken along line 13—13 of FIG. 10.

FIG. 14 is a exploded front view of an alternate embodiment of the present invention.

FIG. 15 is an exploded top view of FIG. 14.

FIG. 16 is an exploded end view of FIG. 14.

FIG. 17 is a side view of a further alternate embodiment of the invention.

FIG. 18 is a top view of FIG. 17.

FIG. 19 is an end view of FIG. 18.

FIG. 20 is a front view of the finger that is used in the alternate embodiment of the invention of FIGS. 17–19.

FIG. 21 is a top view of FIG. 20.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
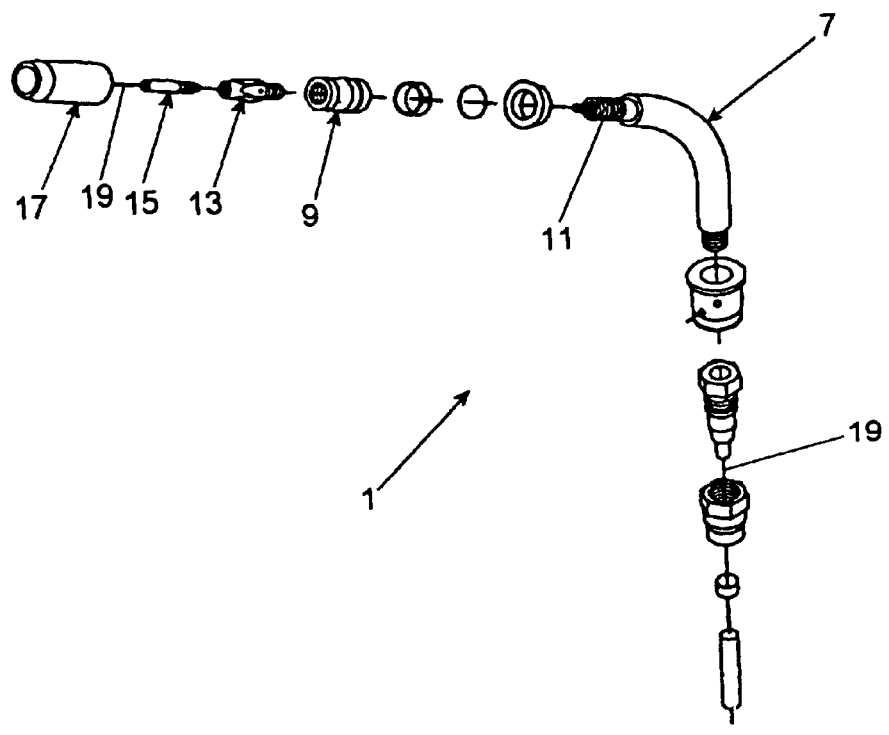
FIG. 1 is a exploded perspective view of a typical prior mig welding gun that may be modified to advantageously include the present invention.
Figure 1:
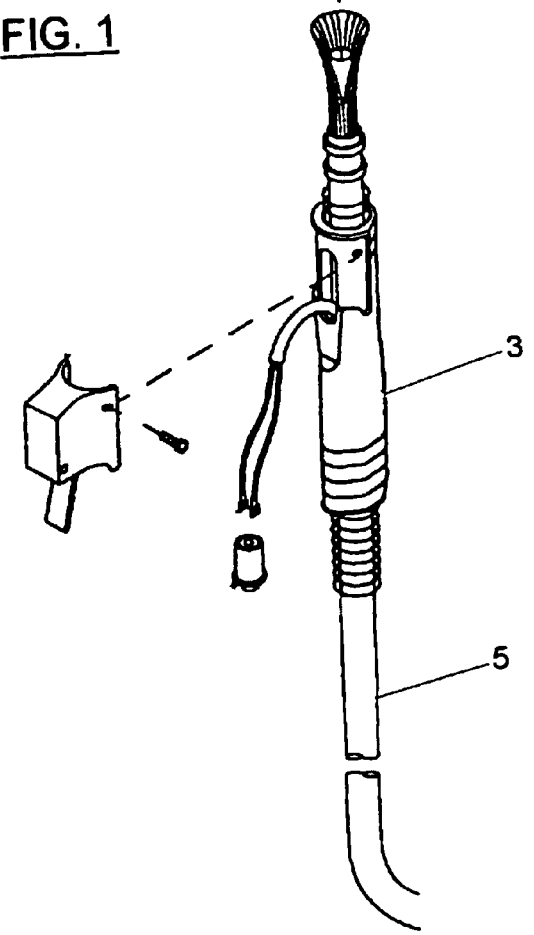

Briefly by way of background, FIG. 1 shows the major components of a typical prior mig welding gun 1. The gun 1 includes a handle 3 that is connected by a cable 5 to a welding machine, not shown. A head tube 7 is joined to the handle 3. A sleeve 9 is threaded onto the downstream end 11 of the head tube 7. In turn, a hollow diffuser 13 is joined to the sleeve 9. Threads of a contact tip 15 engage threads in the diffuser 13. A nozzle 17 surrounds the diffuser 13 and the contact tip 15. A long flexible weld wire 19 is fed from the welding machine through the cable 5, handle, head tube, and out the contact tip. Welding power from the welding machine is conducted through the cable, handle, and head tube to the diffuser and contact tip. The welding power is conducted to the weld wire 19 as it slides through the contact tip.

In accordance with the present invention, an alternate path is provided for conducting the welding power from the welding gun diffuser 13 to the weld wire 19 in addition to the path through the contact tip 15. Looking at FIGS. 2–5, the alternate current path is provided by an insert 21. In the illustrated construction, the insert 21 is fabricated from a thin piece of resilient metallic material. The insert has a tubular body 23 with a longitudinal axis 22 and an end 24. The nominal diameter of the tubular body 23 is slightly greater than the inner diameter of the diffuser (FIG. 1).

The insert 21 at its second end 26 is trimmed on opposite sides of the longitudinal axis 22 at reference numerals 25 to make a pair of fingers 27. The fingers 27 are bent in reverse bends 29 and 31 toward the axis 22 such that the fingers are close to each other. The body 23 is slit longitudinally at reference numeral 32 between the end 24 and one of the trim lines 25.

Figure 6:
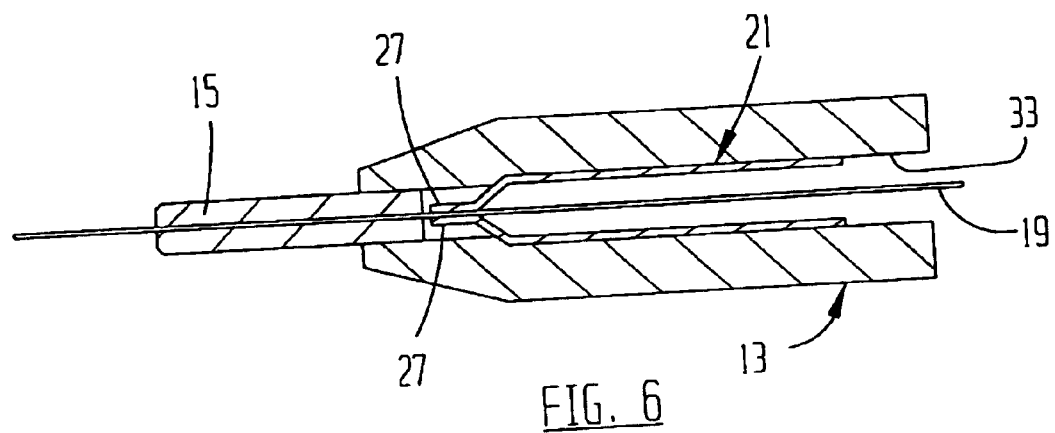
FIG. 6 is an enlarged partial view of the insert of FIGS. 2–5 assembled in a welding gun.
Figures 3, 4, 5:
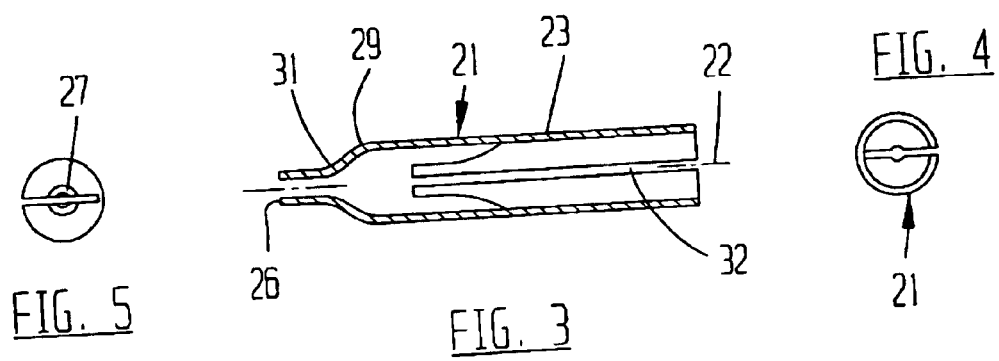
FIG. 3 is a longitudinal cross sectional view of FIG. 2.
FIG. 4 is a first end view of FIG. 3.
FIG. 5 is a second end view of FIG. 3.
Figure 2:
FIG. 2 is an front view of an insert having resilient fingers that provide an alternate current path for a mig welding gun according to the present invention.

When the insert 21 is installed in the inner diameter 33 of the diffuser 13, FIG. 6, it collapses slightly such that the spacing between the fingers 27 is less than the diameter of weld wire 19. Consequently, the weld wire spreads the fingers apart when the weld wire is initially fed through the insert. The restoring force of the resilient insert material produces a firm and reliable path for conducting welding power from the diffuser to the weld wire. The current densities between the weld wire and the insert fingers are less than if there were only a single interface between the weld wire and the contact tip 15. As a result, the probability of arcing or microwelding of the weld wire to the contact tip or to the insert is greatly diminished compared with using only the prior contact tip 15 for power conduction.

Turning to FIGS. 7–9, a path for conducting welding power from a diffuser 13' to a weld wire 19' utilizes a contact tip assembly 34. In the preferred embodiment, the contact tip assembly 34 comprises a contact tip 36 having a first end 37 and a second end 39. A body 38 at the first end 37 has external threads that engage internal threads of the diffuser 13'. Flexible fingers 35 at the contact tip second end 39 are electrically conductive with the body 38. As illustrated the flexible fingers 35 are integral with the body 38. Alternately, the flexible fingers are not necessarily integral with the body, but the fingers must at least be electrically conductive with the body. The fingers 35 define respective concentric partial frusto-conical external surfaces 41 that diverge toward the second end 39.

As illustrated, the contact tip 36 has three fingers 35, although more or fewer fingers are within the scope of the invention. The fingers are separated by longitudinal slits 42 in a tubular portion 46. The slits 42 terminate at respective edges 43 of the body 38. The slit tubular portion 46 acts as a number of flexible necks between the body and a head 68 of each finger. The fingers have respective first arcuate inner surfaces 44 that may be continuations of an inner diameter 47 of the body and that cooperate to make a first inner diameter of the finger necks. Near the contact tip second end 39, the finger heads 68 have respective second inner surfaces 45 that cooperate to make a second inner diameter. The second inner diameter may be slightly less than the diameter of the weld wire 19'. Alternately, the second inner diameter may be equal to or slightly larger than the diameter of the weld wire 19', in which case a spring 52 urges the inner surfaces 45 into contact with the weld wire, as will be explained shortly, at a slightly different location. The second inner surfaces 45 may be relatively narrow in the transverse direction such that they approach being knife edges. Alternately, and as shown, the inner surfaces may be relatively wide in the transverse direction. In that case, the inner surfaces 45 are arcuate in shape to form an inner diameter that has generally the same diameter as the weld wire. The fingers also have respective arcuate outer surfaces 48 that cooperate with the first inner surfaces 44 to define a wall thickness of the finger necks at the tubular portion 46. The wall thickness of the necks is sufficiently thin such that the fingers can bend in cantilever fashion about the body.

An annular member in the form of a sleeve 49 surrounds most of the contact tip fingers 35. The sleeve 49 has an inner diameter 50 with a frusto-conical surface 51 at one end. The sleeve frusto-conical surface 51 mates with the frusto-conical surfaces 41 of the fingers. A compression spring 52 is interposed between an end 53 of the diffuser 13' and the second end 54 of the sleeve. The spring 52 urges the sleeve frusto-conical surface 51 against the finger heads frusto-conical surfaces 41. As a result, the fingers are biased radially inwardly such that the surfaces 45 make intimate contact with the weld wire 19'. The sleeve outer diameter 62 is preferably relieved for part of its length from the end 54 to a step 63.

To prevent the weld wire 19' from protruding between the contact tip slits 42, a liner 55 is also part of the contact tip assembly 34. The liner 55 has an outer diameter 58 that fits loosely in the inner diameter 44 of the finger necks. An inner diameter 59 of the liner loosely receives the weld wire. Preferably, the liner extends for a majority of the length of the contact tip body 38 and tubular portion 46. The liner is made from an insulative material.

The final component of the contact tip assembly 34 is an annular shield 56. The shield 56 has a wall 61 with internal threads that mate with external threads on the diffuser 13'. The shield surrounds a part of the diffuser and the fingers 35, and the sleeve 49. The shield has an end wall 57 close to the contact tip second end 39. The shield end wall 57 has a hole 74 through it that is substantially larger in diameter than the diameter of the weld wire 19'. Several radial holes 60 pass through the wall 61 of the shield near the sleeve step 63. The shield is made of an insulative material, such as a ceramic material having a high melting temperature. The inner end wall 70 of the shield is spaced from the end 39 of the contact tip 36 to allow debris and spatter to accumulate therein without hindering the operation of the contact tip.

In use, the contact tip assembly 34 is assembled to the diffuser 13' in a manner generally similar to the installation of a conventional contact tip. A conventional nozzle 17' surrounds the diffuser and the contact tip assembly. The contact tip assembly assures a reliable interface between the finger surfaces 45 and the weld wire 19'. The relatively long length of the finger surfaces 45 reduce welding power density between the contact tip 36 and the weld wire. Further, the interface between the contact tip and the weld wire occurs only at the surfaces 45, which is at a constant distance from a workpiece. Consequently, preheating of the weld wire between the workpiece and the contact tip is uniform for all welding conditions. The spring biased fingers 35 scrape off any grit or other foreign material that is on the weld wire before it passes between the surfaces 45. The welding quality is thus not compromised by foreign matter at the welding arc.

Arrows 64 and 65 represent the paths of the flows of the inert gas used with mig welding. Most of the gas flows outwardly through radial holes 66 in the diffuser 13', arrows 64. Some of the gas, arrows 65, flows downstream around the weld wire 19' inside the liner inner diameter 59, through the contact tip slits 42, past the spring 52, and out the shield holes 60. The paths 64 and 65 recombine as the gas leaves the nozzle, arrow 67, to surround the welding arc. The hole 74 in the shield wall 57 allows the weld wire 19' to pass through but prevents burnback of the weld wire from reaching the contact tip 36. The hole 74 is sized tq be relatively large such that only an extremely large burnback ball could plug the hole and fuse the weld wire to the shield.

FIGS. 10–13 depict a further modified construction for a contact tip assembly 69 according to the invention. A contact tip 71 has a body section 75 with a first end 72. Threads 73 at the first end 72 on the body section 75 engage a conventional diffuser, not shown. The contact tip body section has an inner diameter 77 that is slightly larger than the diameter of a weld wire 79. On the outer diameter of the body section is a flange 81.

The contact tip 71 further has a number of fingers 83 that are integral with the body section 75. As illustrated, there are four fingers 83, but more or fewer fingers are also acceptable. The fingers are separated by radial slits 85 from the contact tip second end 87 to the body section 75. The contact tip fingers have respective head portions 90 that connect to the body section by respective flexible necks 93. The head portions 90 have respective partial frusto-conical outer surfaces 91 that converge toward the second end 87. The head portions also have respective inner surfaces 89 that together define a circular passage concentric with the body section inner diameter 77.

Surrounding the contact tip 71 except for the threads 73 is an annular member in the form of an insulated casing 95. The particular casing 95 illustrated has an interior surface 97 consisting of a cylindrical surface 103 and a frusto-conical interior surface 105. The casing further has a cylindrical exterior surface 106 parallel to the interior surface 103, and a frusto-conical surface 108 that is generally parallel to the frusto-conical interior surface 105. Alternately, other slopes could be used, including faceted sides and pyramidal sides. The casing frusto-conical interior surface 105 converges at the same angle as the frusto-conical surfaces 91 of the contact tip fingers 83.

The contact tip assembly 69 further comprises a snap ring 107 in the cylindrical interior surface 103 of the casing 95. A spring 109 is interposed between the snap ring 107 and the flange 81 of the contact tip 71. The spring 109 urges the frusto-conical interior surface 105 of the casing against the contact tip fingers 83. That action biases the fingers radially inwardly against the weld wire 79. In that manner, there is always a stable interface between the finger surfaces 89 and the weld wire. Consequently, the transfer of welding power from the contact tip to the weld wire is achieved without arcing, microwelding, or variable preheating of the weld wire.

FIGS. 14–16 show an alternate contact tip assembly 111 that reliably conducts welding power to a weld wire 115. The contact tip assembly 111 has a contact tip 116 with threads 117 that engage a diffuser, not illustrated in FIGS. 14–16. A hole 118 extends through the contact tip 116 between its ends 120 and 131. The diameter of the hole 118 is slightly larger than the diameter of the weld wire 115.

The contact tip 116 is formed with three pockets. A first pocket 119 near the threads 117 receives a spring 121. The first pocket 119 does not break into the hole 118. A second pocket 123 may be obround in shape. A first hole 125 extends transversely from the second pocket 123 to the outside of one side of the contact tip 116. A second hole 127 extends from the second pocket oppositely from and concentric with the first hole 125. Preferably, the second hole 127 is threaded. The second pocket does not break into the hole 118. The third pocket 129 is elongated and is at the contact tip second end 131. The third pocket 129 breaks into the hole 118.

The contact tip pockets 123 and 129 are designed to accommodate a finger 133. The finger 133 has a lug 134 that fits in the pocket 123. A screw 135 passes through the contact tip hole 125 and a hole 137 in the finger lug 134, and threads into the contact tip hole 127. When assembled, a finger tab 139 fits in the body pocket 129. The spring 121 biases a surface 141 of the finger tab 139 against the weld wire 115. In that manner, the weld wire is consistently in contact with both the hole 118 in the contact tip and the surface 141 of the finger tab. The result is uniform welding power transfer, without arcing or microwelding of the weld wire, during a welding process.

In a further alternate embodiment as depicted in FIGS. 17–21, a contact tip assembly 143 comprises a contact tip 145 and a finger 147. The contact tip 145 is generally cylindrical in shape, having two ends 149 and 151, a longitudinal axis 152, and a longitudinal hole 153. The hole 153 receives a weld wire 154. The contact tip has threads 155 near the end 149. A transverse slot 157 is cut through the contact tip. The slot 157 has a transverse wall 159 generally perpendicular to the longitudinal axis 152, and a flat bottom wall 161 parallel to the longitudinal axis. The bottom wall 161 opens into the hole 153. There is an angled wall 163 connecting the bottom wall opposite the transverse wall. The angled wall 163 terminates in a short end wall 165 that is generally parallel to the transverse wall 159. The contact tip also includes a longitudinal slot 167. The longitudinal slot 167 intersects the slot 157 at the transverse wall 159.

The finger 147 has a side edge 169 and a bottom edge 171 perpendicular to the side edge. An angled edge 173 meets the bottom edge 171 at a tip 174. The angled edge 173 connects to the side edge 169 by means of a chamfer 175. There is also a chamfer 177 between the side and bottom edges. The width of the finger is slightly less than the width of the contact tip longitudinal slot 167.

In use, the finger tip 174 is placed under the angled wall 163 of the contact tip 145 with the finger 147 also being partially within the contact tip longitudinal slot 167. The finger is simultaneously tilted and inserted into the slots 157 and 167 such that the finger bottom surface 171 is in flat intimate but non-binding contact with the weld wire 154. In that manner, conduction of welding power from the contact tip to the weld wire occurs in a reliable manner at a controlled interface.

Thus, it is apparent that there has been provided, in accordance with the invention, a current path for mig welding guns that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A contact tip assembly for a mig welding gun having a diffuser through which a weld wire and a gas pass comprising:
   a. a contact tip having first and second ends and a body with a hole through which a weld wire passes, and at least one finger pivotally connected to the body; and
   b. means for biasing said at least one finger radially inwardly against the weld wire to provide a reliable interface for conducting welding power between the contact tip assembly and the weld wire comprising a spring interposed between the body and said at least one finger, the spring urging said at least one finger to pivot into contact with the weld wire.

2. The contact tip assembly of claim 1 wherein:
   a. said at least one finger has a first end that defines a surface that is in contact with the weld wire, and a second end; and
   b. the spring is interposed between the body and said at least one finger second end.

3. In a mig welding gun that directs a weld wire to a workpiece and having a diffuser and a nozzle, a contact tip assembly comprising:
   a. a contact tip having first and second ends, a body at the first end that engages the diffuser, and at least one finger at the second end that is pivotally connected to the body; and
   b. means for biasing said at least one finger radially inwardly against the weld wire to provide reliable power conduction from the contact tip to the weld wire comprising a spring conducting between the body and said at least one finger to bias said at least one finger onto contact with the weld wire.

4. The contact tip assembly of claim 3 wherein:
   a. the finger has first and second ends;
   b. the finger is pivotally connected to the body between the first and second ends; and
   c. the spring is interposed between the finger second end and the body to bias the finger first end against the weld wire.

5. The contact tip assembly of claim 4 wherein the finger first end defines an arcuate surface that is in contact with the weld wire.

6. The contact tip assembly of claim 4 wherein the finger first end comprises a tab having a surface that contacts the weld wire.

7. A contact tip assembly for a welding gun comprising:
   a. a body having first and second ends and a hole through which a weld wire passes, the body having a periphery extending between the first and second ends that is generally symmetrical about the hole, the body periphery defining a first pocket that breaks into the hole, and a second pocket;
   b. a finger having a lug received in and pivotally connected to the body second pocket and having a tab that fits within the body first pocket; and
   c. a spring coacting between the finger and the body to bias the finger tab against the weld wire to thereby provide a stable interface for conducting welding power between the contact tip and the weld wire.

8. The contact tip assembly of claim 7 wherein:
   a. the finger has first and second ends, the tab being at the finger first end;
   b. the finger is pivotally connected between the tab and the finger second end; and
   c. the spring coacts between the finger second end and the body to thereby pivot the tab into contact with the weld wire.

9. A contact tip assembly for use with a mig welding gun comprising:
   a. a contact tip defining a longitudinal axis and having a hole through which a weld wire passes, the contact tip defining a first slot that breaks into a predetermined portion of the hole to expose the weld wire and that has a transverse wall that is generally perpendicular to the longitudinal axis, the contact tip further defining a second slot that intersects the first slot at the transverse wall thereof; and b. a finger removeably held in the contact tip slots, the finger being in intimate but non-binding contact with the weld wire to provide a stable interface for conducting electrical power between the contact tip and the weld wire.

10. A contact tip assembly for use with a mig welding gun comprising:

a. a contact tip having a hole through which a weld wire passes, the contact tip defining a slot that breaks into a predetermined portion of the hole to expose the weld wire, wherein the contact tip slot is formed with a bottom edge that breaks into the hole, and an angled edge; and b. a finger removeably held in the contact tip slots, the finger being in intimate but non-binding contact with the weld wire to provide a stable interface for conducting electrical power between the contact tip and the weld wire, wheein the finger is in the shape of a wedge that is held in the contact tip slots between the contact tip angled edge and bottom edge.

* * * * *